US009635210B2

(12) United States Patent
Horiguchi

(10) Patent No.: US 9,635,210 B2
(45) Date of Patent: Apr. 25, 2017

(54) IMAGE READING APPARATUS THAT ACQUIRES OF APPROPRIATE WHITE REFERENCE DATA, IMAGE READING METHOD, AND IMAGE FORMING APPARATUS

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/049,797

(22) Filed: Feb. 22, 2016

(65) Prior Publication Data

US 2016/0248932 A1 Aug. 25, 2016

(30) Foreign Application Priority Data

Feb. 25, 2015 (JP) ................. 2015-034933

(51) Int. Cl.
*H04N 1/00* (2006.01)
*H04N 1/04* (2006.01)
*H04N 1/401* (2006.01)
*H04N 1/46* (2006.01)
*H04N 1/48* (2006.01)
(Continued)

(52) U.S. Cl.
CPC ........ *H04N 1/0408* (2013.01); *H04N 1/0009* (2013.01); *H04N 1/00013* (2013.01); *H04N 1/00023* (2013.01); *H04N 1/00034* (2013.01); *H04N 1/00814* (2013.01); *H04N 1/401* (2013.01); *H04N 1/40006* (2013.01); *H04N 1/46* (2013.01); *H04N 1/484* (2013.01); *H04N 1/6041* (2013.01); *H04N 2201/0081* (2013.01)

(58) Field of Classification Search
None
See application file for complete search history.

(56) References Cited

U.S. PATENT DOCUMENTS 7,755,804 B2 * 7/2010 Ikeno ................. H04N 1/00002
358/461
8,755,701 B2 * 6/2014 Hyoki ................ G03G 15/5062
399/51

(Continued)

FOREIGN PATENT DOCUMENTS

JP 11-191843 A 7/1999

*Primary Examiner* — Scott A Rogers
(74) *Attorney, Agent, or Firm* — Stein IP, LLC

(57) ABSTRACT

An image reading apparatus includes a reading circuit, a white reference member, a control circuit, a memory circuit, and a processing circuit. The control circuit controls the reading circuit to: cause a light source to irradiate the white reference member with lights of a plurality of colors and cause a light receiving unit to receive the reflected lights. The processing circuit performs a process to identify abnormal data included in white reference data stored in the memory circuit. The processing circuit identifies information on the abnormal data in a light of an abnormal-data detected color among the plurality of colors. The processing circuit identifies the abnormal data in lights of other colors excluding the abnormal-data detected color among the plurality of colors based on the information on the abnormal data. The information is identified for the light of the abnormal-data detected color.

6 Claims, 10 Drawing Sheets

(51) Int. Cl.
*H04N 1/60* (2006.01)
*H04N 1/40* (2006.01)

(56) References Cited

U.S. PATENT DOCUMENTS

| | | | |
|---|---|---|---|
| 9,066,052 B2* | 6/2015 | Takemura | H04N 1/60 |
| 9,432,552 B2* | 8/2016 | Kato | H04N 1/4076 |
| 9,516,183 B2* | 12/2016 | Shibata | H04N 1/00551 |
| 2012/0002253 A1* | 1/2012 | Nagamochi | H04N 1/401 358/509 |

* cited by examiner

IMAGE READING APPARATUS THAT ACQUIRES OF APPROPRIATE WHITE REFERENCE DATA, IMAGE READING METHOD, AND IMAGE FORMING APPARATUS

INCORPORATION BY REFERENCE

This application is based upon, and claims the benefit of priority from, corresponding Japanese Patent Application No. 2015-034933 filed in the Japan Patent Office on Feb. 25, 2015, the entire contents of which are incorporated herein by reference.

BACKGROUND

Unless otherwise indicated herein, the description in this section is not prior art to the claims in this application and is not admitted to be prior art by inclusion in this section.

There has been known the following image reading apparatus. The image reading apparatus irradiates a document with light from a light source. Light receiving elements receive the reflected light to read image data on the document. This image reading apparatus reads the image data at a uniform print density regardless of unevenness in sensitivity of the light receiving elements and a variation in amount of light of the light source. Therefore, reading a white reference member using respective light receiving elements acquires white reference data. A plurality of positions of the white reference member are read, and an averaging process is performed on a plurality of pieces of data acquired by these respective light receiving elements. Thus, the white reference data is acquired. This reduces an influence of variation in print density or a similar variation of the white reference member itself, ensuring acquiring appropriate white reference data.

However, it is difficult to acquire the sufficiently appropriate white reference data only by performing the above-described averaging process on the plurality of pieces of data. Accordingly, the following method has been known. If the plurality of pieces of data include abnormal data, the abnormal data is excluded and then the averaging process is performed. Thus, further appropriate white reference data is acquired. Additionally, a method that sorts the white reference data and then excludes the abnormal data from the white reference data has also been known.

SUMMARY

An image reading apparatus according to an aspect of the disclosure includes a reading circuit, a white reference member, a control circuit, a memory circuit, and a processing circuit. The reading circuit includes a light source and a light receiving unit. The control circuit controls the reading circuit to: cause the light source to irradiate the white reference member with lights of a plurality of colors and cause the light receiving unit to receive the reflected lights. The memory circuit stores white reference data acquired by receiving the reflected lights. The processing circuit performs a process to identify abnormal data included in the white reference data stored in the memory circuit. The processing circuit identifies information on the abnormal data in a light of an abnormal-data detected color among the plurality of colors. The processing circuit identifies the abnormal data in lights of other colors excluding the abnormal-data detected color among the plurality of colors based on the information on the abnormal data. The information is identified for the light of the abnormal-data detected color.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
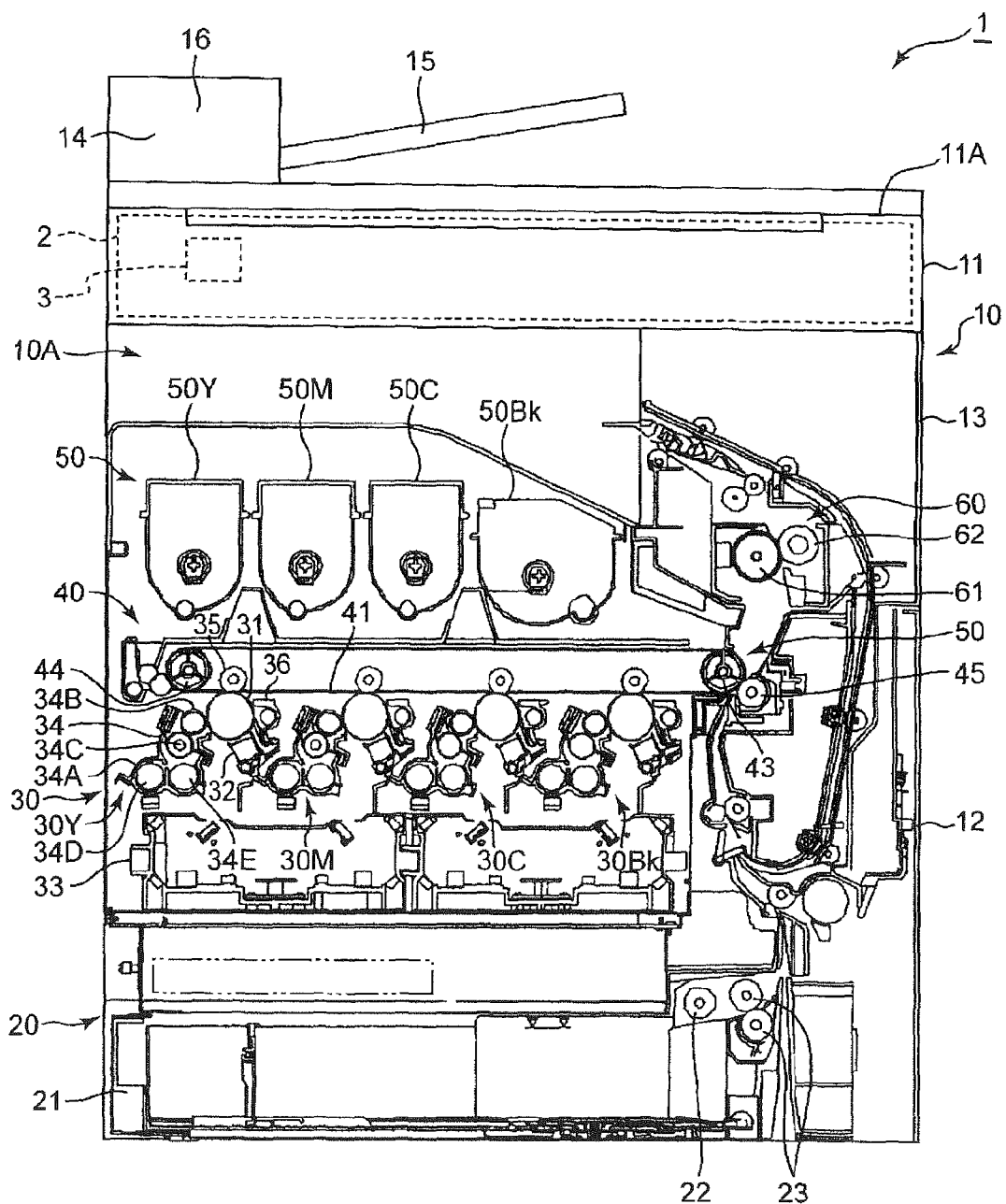
FIG. 1 schematically illustrates an internal structure of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure in detail based on the drawings.

Configuration of Image Forming Apparatus

Figure 2:
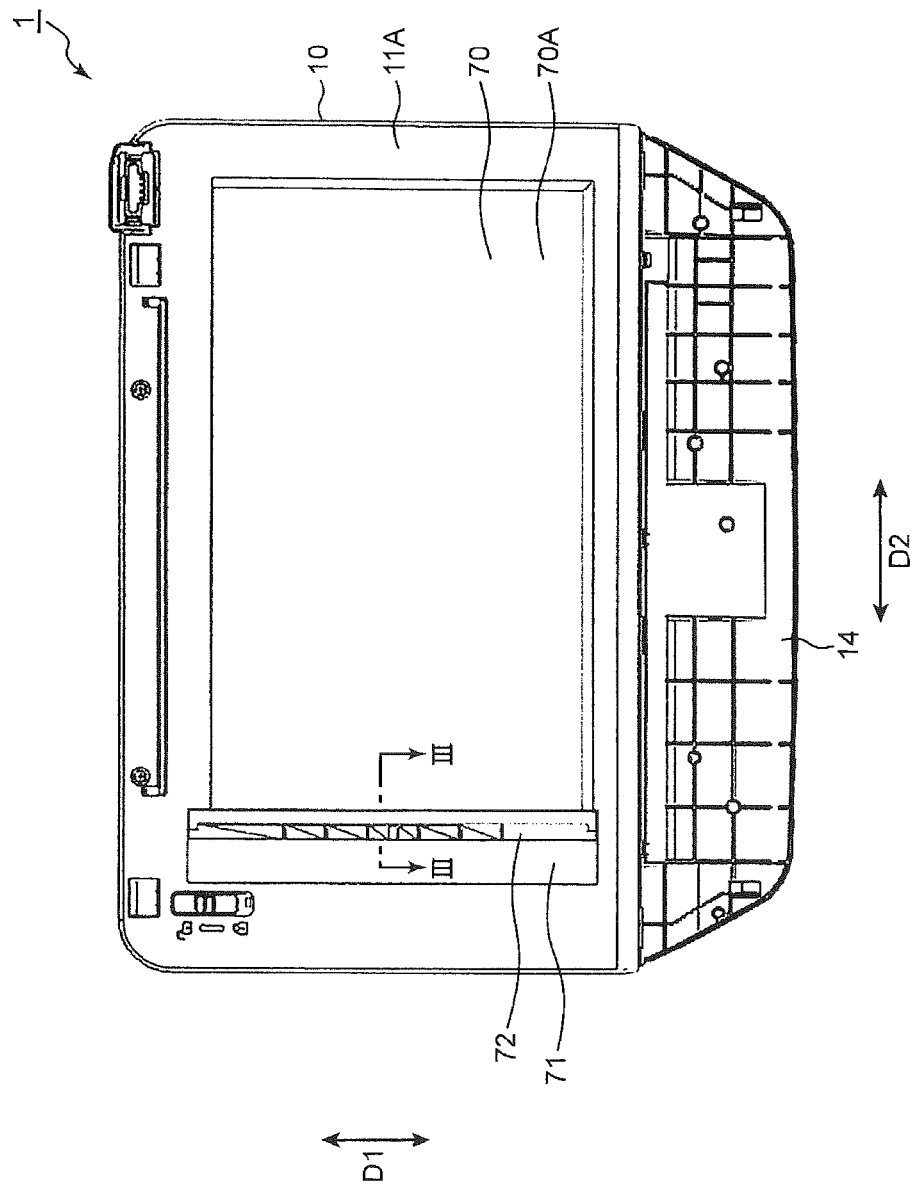
FIG. 2 schematically illustrates a configuration of a top surface of the image forming apparatus according to one embodiment.

First, the following describes a configuration of an image forming apparatus 1 according to one embodiment of the disclosure with reference to FIGS. 1 and 2. FIG. 1 illustrates the internal structure of the image forming apparatus 1.

With reference to FIG. 1, the image forming apparatus 1 is a copier. The image forming apparatus 1 includes a main body housing 10 having a chassis structure. The main body housing 10 internally includes an image reading apparatus 2, which includes a reading unit 3 (also referred to as a reading circuit) reading document images, a paper sheet feeder 20, an image forming unit 30, a transfer unit 40, a replenishment unit 50, and a fixing unit 60. Details of the configuration of the image reading apparatus 2 will be described later.

The main body housing 10 includes an upper main body housing 11, which has a chassis structure having an approximately rectangular parallelepiped shape, a lower main body housing 12, and a connection main body housing 13. The main body housing 10 is configured by connecting the upper main body housing 11 to the lower main body housing 12, which is arranged below the upper main body housing 11, with the connection main body housing 13. A region surrounded by the upper main body housing 11, the lower main body housing 12, and the connection main body housing 13 is configured as a paper discharge space 10A. To the paper discharge space 10A, a sheet after an image formation process is performed is discharged.

The image forming apparatus 1 further includes a document conveying unit 14. The document conveying unit 14 is turnably mounted to a top surface 11A of the main body housing 10. The document conveying unit 14 includes a document tray 15 and a conveying unit 16. Documents are installed on the document tray 15. The conveying unit 16 conveys the document such that the document goes through a document reading position where the document is optically read by the image reading apparatus 2.

FIG. 2 illustrates the top surface of the image forming apparatus 1 whose document conveying unit 14 is open upward. The image forming apparatus 1 further includes a fixed document reading glass 70, a conveyed-document reading glass 71, and a document discharge guide 72, which are arranged on the top surface 11A of the main body housing 10.

The fixed document reading glass 70 has a placement surface 70A. The placement surface 70A has a rectangular shape with its longitudinal direction in a sub-scanning direction D2. The documents are placed on the placement surface 70A. The conveyed-document reading glass 71 has a rectangular shape with its longitudinal direction in a main-scanning direction D1, which is perpendicular to the sub-scanning direction D2. The conveyed-document reading glass 71 is arranged adjacent to the fixed document reading glass 70. The document discharge guide 72 is arranged between the fixed document reading glass 70 and the conveyed-document reading glass 71.

When the document is installed by hands, as illustrated in FIG. 2, the document conveying unit 14 is opened upward to place the document on the placement surface 70A. The document is pressed against the fixed document reading glass 70 by a platen mat (not illustrated) and the document conveying unit 14 so as to be fixed. The reading unit 3 (FIG. 1) is scanned in the sub-scanning direction D2 below the fixed document reading glass 70 to read image data on the document.

Meanwhile, to automatically convey the documents, as illustrated in FIG. 1, the document conveying unit 14 is arranged on the top surface 11A of the main body housing 10, and the documents are installed to the document tray 15. The position of the reading unit 3 is fixed below the conveyed-document reading glass 71 (FIG. 2). The conveying unit 16 conveys the document installed on the document tray 15 on the conveyed-document reading glass 71 to read the image data on the document. Then, the document discharge guide 72 discharges the document after being read.

With reference to FIG. 1, the paper sheet feeder 20 is a part that houses the sheets on which the image formation process is to be performed. These sheets are fed by the paper sheet feeder 20. The paper sheet feeder 20 includes a sheet feed cassette 21, a pickup roller 22, and a feed roller pair 23. The sheet feed cassette 21 is arranged inside the lower main body housing 12 and houses a sheet bundle. The pickup roller 22 and the feed roller pair 23 are arranged near this sheet feed cassette 21.

When replenishing the sheet or performing a similar operation, the sheet feed cassette 21 is drawn from the lower main body housing 12 to the front direction. The pickup roller 22 feeds the sheet bundle, which is housed in the sheet feed cassette 21, one by one from the uppermost sheet. The feed roller pair 23 sends out the sheet fed by the pickup roller 22 to a sheet conveyance path side.

The image forming unit 30 is a part that forms toner images transferred to the sheet, based on the image data on the document, which is acquired by the image reading apparatus 2. The image forming unit 30 includes a yellow unit 30Y, a magenta unit 30M, a cyan unit 30C, and a black unit 30Bk as a plurality of image forming units forming toner images of different colors. The yellow unit 30Y uses a yellow (Y) developer. The magenta unit 30M uses a magenta (M) developer. The cyan unit 30C uses a cyan (C) developer. The black unit 30Bk uses a black (Bk) developer. The image forming units 30Y, 30M, 30C, and 30Bk are arranged in this order from upstream to downstream of a rotation direction of an intermediate transfer belt 41, which will be described later.

The image forming units 30Y, 30M, 30C, and 30Bk each include a photoreceptor drum 31, a charging apparatus 32, a developing device 34, a primary transfer roller 35, and a cleaning apparatus 36, which are arranged at the peripheral area of the photoreceptor drum 31. The image forming unit 30 further includes an exposure apparatus 33, which is arranged below the image forming units 30Y, 30M, 30C, and 30Bk. The exposure apparatus 33 is commonly used to the respective image forming units 30Y, 30M, 30C, and 30Bk.

The photoreceptor drum 31 is made of an amorphous silicon (a-Si)-based material. An electrostatic latent image and the toner image are formed at the circumference surface of the photoreceptor drum 31. The charging apparatus 32 uniformly charges the surface of the photoreceptor drum 31. The exposure apparatus 33 includes various optical instruments such as a light source and a mirror. The exposure apparatus 33 irradiates the circumference surface of the photoreceptor drum 31, which is uniformly charged by the charging apparatus 32, with light based on the image data on the document acquired by the image reading apparatus 2. Thus, the exposure apparatus 33 forms the electrostatic latent image.

The developing device 34 supplies toner, which is a developer, to the photoreceptor drum 31 on which the electrostatic latent image is formed, thus developing this electrostatic latent image. The developing device 34 includes a development housing 34A, a developing roller 34B, a magnetic roller 34C, a first transport screw 34D, and a second transport screw 34E. The development housing 34A houses the toner. The developing roller 34B holds the toner at the circumference surface to supply the photoreceptor drum 31 with this toner. The first transport screw 34D and the second transport screw 34E circularly conveys the toner in the development housing 34A while stirring the toner.

The primary transfer roller 35 sandwiches the intermediate transfer belt 41, which will be described later, with the photoreceptor drum 31 to form a primary transfer nip area. The primary transfer roller 35 primarily transfers the toner image formed on the circumference surface of the photoreceptor drum 31 on the intermediate transfer belt 41. After the toner image is primarily transferred on the intermediate transfer belt 41, the cleaning apparatus 36 cleans the circumference surface of the photoreceptor drum 31.

The transfer unit 40 is a part that transfers the toner image formed by the image forming unit 30 to the sheet sent out from the paper sheet feeder 20. The transfer unit 40 includes the intermediate transfer belt 41, a drive roller 43, and a driven roller 44. The intermediate transfer belt 41 is formed of an endless belt-shaped rotator. The drive roller 43 and the driven roller 44 are rotatably supported to the transfer unit 40. The intermediate transfer belt 41, which is sandwiched between the photoreceptor drum 31 and the primary transfer roller 35, is bridged across the drive roller 43 and the driven roller 44.

The transfer unit 40 further includes a secondary transfer roller 45. The secondary transfer roller 45 is arranged opposed to the drive roller 43. The secondary transfer roller 45 sandwiches the intermediate transfer belt 41 with the drive roller 43 to form a secondary transfer nip area. A toner image primarily transferred on the intermediate transfer belt 41 is secondarily transferred to the sheet fed from the paper sheet feeder 20 at this secondary transfer nip area.

The replenishment unit 50 is a part that accumulates the toner used by the image forming unit 30. The replenishment unit 50 includes a yellow toner container 50Y, a magenta toner container 50M, a cyan toner container 50C, and a black toner container 50Bk. The toner containers 50Y, 50M, 50C, and 50Bk each replenish the toner of respective colors to the developing devices 34 for the respective image forming units 30Y, 30M, 30C, and 30Bk.

The fixing unit 60 is a part that performs a fixing process of the toner image secondarily transferred on the sheet at the secondary transfer nip area. The fixing unit 60 includes a fixing roller 61 and a pressure roller 62. The fixing roller 61 internally includes a heating source (not illustrated). The pressure roller 62 forms a fixing nip area with this fixing roller 61. When the sheet on which the toner image has been secondarily transferred is passed through this fixing nip area, the toner image is fixed on the sheet by heating by the fixing roller 61 and pressing force by the pressure roller 62.

Configuration of Image Reading Apparatus

Figure 3:
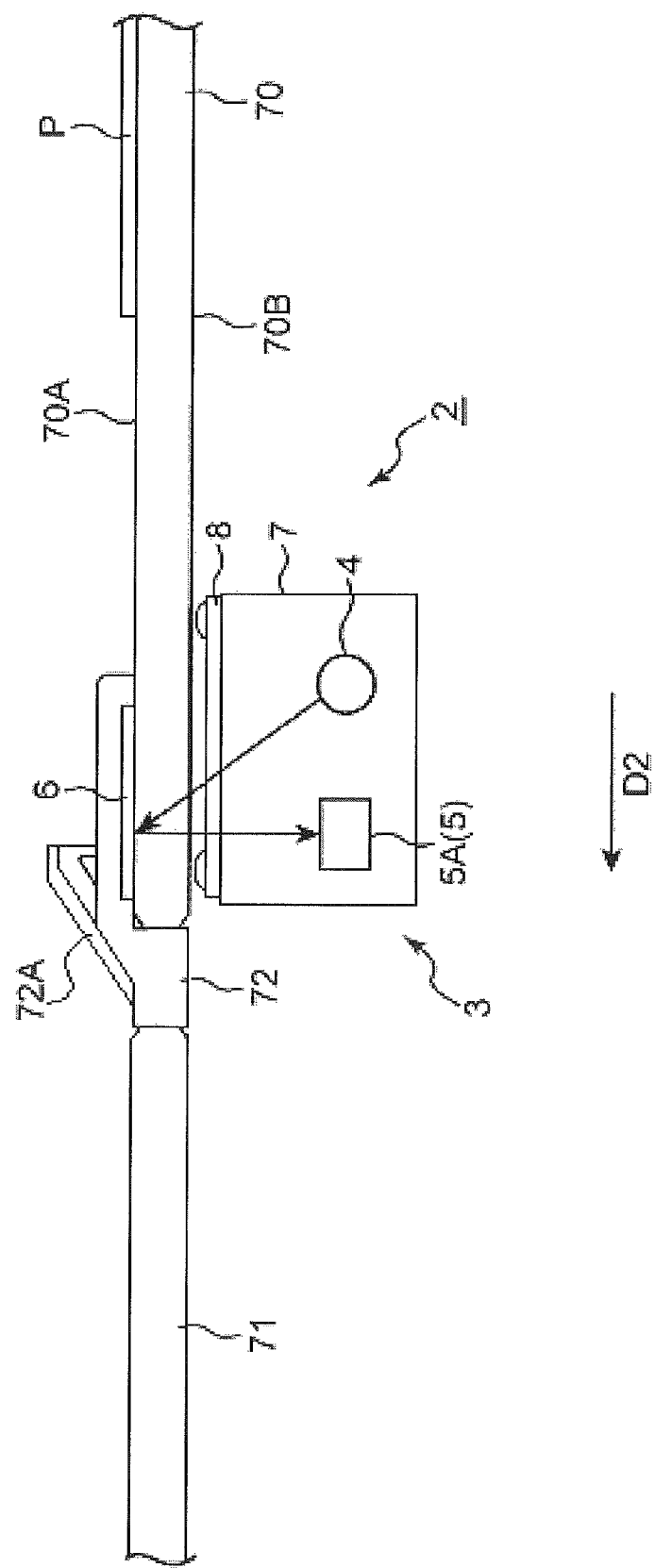
FIG. 3 illustrates a cross section taken along the line segment III-III in FIG. 2.

Next, the following describes the configuration of the image reading apparatus 2 according to the embodiment included in the image forming apparatus 1 with reference to FIGS. 3 to 7. FIG. 3 illustrates a cross-sectional part taken along the line segment in FIG. 2.

Figure 6:
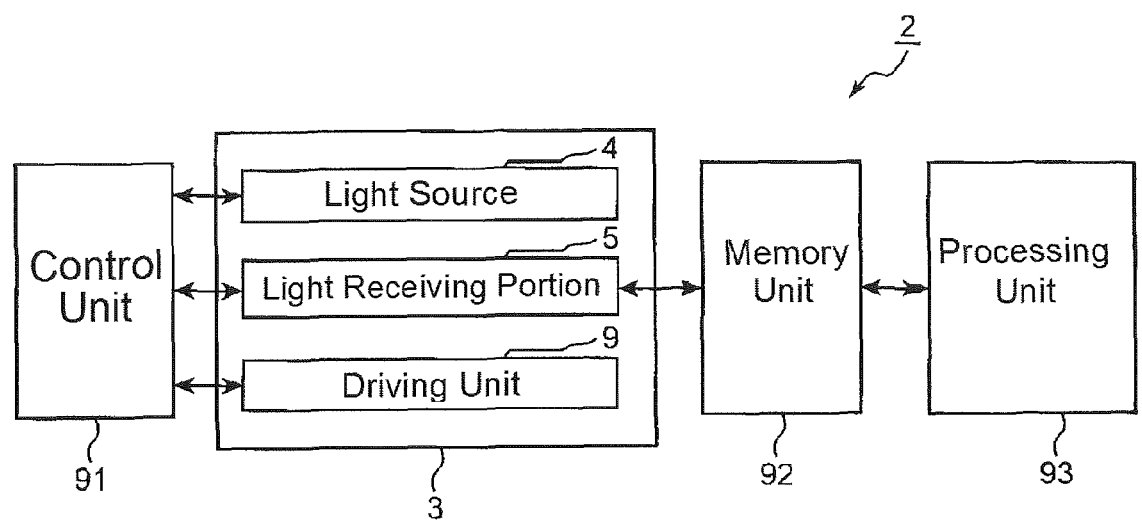
FIG. 6 illustrates an electrical configuration of the image reading apparatus according to one embodiment.

With reference to FIG. 3, the image reading apparatus 2 includes the reading unit 3. The reading unit 3 includes a light source 4, a lens (not illustrated), a light receiving unit 5, a main unit 7, a slider unit 8, and a driving unit 9 (FIG. 6). The light source 4 is a contact image sensor (CIS) and emits light irradiated to a document P. The lens condenses the reflected light from the document P. The light receiving unit 5 receives this reflected light. The main unit 7 houses the light source 4, the light receiving unit 5, and the lens. The slider unit 8 is arranged on the main unit 7. The driving unit 9 moves the main unit 7 in the sub-scanning direction D2. The reading unit 3 is arranged below the fixed document reading glass 70 and the conveyed-document reading glass 71 in the upper main body housing 11 (FIG. 1). The reading unit 3 is movable on a back surface 70B by the slider unit 8.

Figure 4:
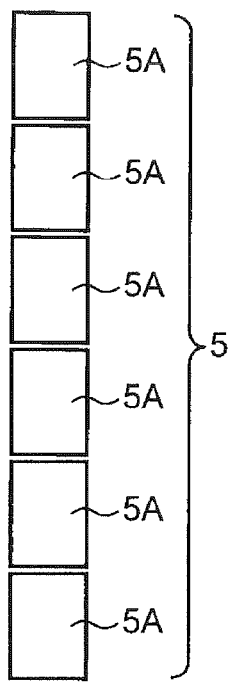
FIG. 4 schematically illustrates a configuration of a light receiving unit included in an image reading apparatus according to one embodiment.

The light source 4 is a light source including a plurality of Light Emitting Diodes (LED). The light source 4 emits three color lights, red (R), green (G), and blue (B). The light source 4 is controlled by a control unit 91 (FIG. 6, also referred to as a control circuit) to selectively emit any one colors of red, green, and blue. The light source 4 is not limited to the LED light source, but light sources using other light-emitting methods may be used. As illustrated in FIG. 4, the light receiving unit 5 is a one-line sensor where a plurality (for example, 5000 pieces) of light receiving elements 5A (pixels) are one-dimensionally arrayed in the main-scanning direction D1. The light receiving unit 5 is controlled by the control unit 91 (FIG. 6) to receive the reflected light from the document P at the light receiving elements 5A. The light receiving unit 5 photoelectrically converts this reflected light to form the image data.

Controlled by the control unit 91 (FIG. 6), the reading unit 3 moves in the sub-scanning direction D2 to irradiate the document P, which is placed on the fixed document reading glass 70, with the lights of respective colors, red, green, and blue. The reading unit 3 receives the reflected light to scan the document P. Controlled by the control unit 91 (FIG. 6), the reading unit 3 irradiates the document automatically conveyed by the document conveying unit 14 on the conveyed-document reading glass 71 (a document reading position) with the lights of respective colors. The reading unit 3 receives the reflected light to scan the document.

The image reading apparatus 2 reads document images at a uniform print density regardless of the unevenness in sensitivity of the light receiving elements 5A and the variation in amount of light of the light source 4. Accordingly, white reference data is regularly acquired. To acquire the white reference data, the image reading apparatus 2 further includes a white reference member (white reference plate) 6. The white reference member 6 is arranged on the placement surface 70A at the end of the fixed document reading glass 70. The document discharge guide 72 is arranged on the white reference member 6. The document discharge guide 72 is arranged between the fixed document reading glass 70 and the conveyed-document reading glass 71 to section both glasses. The document discharge guide 72 has a guide surface 72A on the top surface. The guide surface 72A guides the document that has passed through the conveyed-document reading glass 71 (the document reading position). As illustrated in FIG. 3, the white reference member 6 is arranged sandwiched between the top surface of the fixed document reading glass 70 and the lower surface of the document discharge guide 72.

During calibration, while moving in the sub-scanning direction D2, the reading unit 3 irradiates the white reference member 6 with the lights of respective colors, red, green, and blue. Then, the reading unit 3 receives the reflected light to scan the white reference member 6. The reading unit 3 performs the averaging process on the plurality of pieces of data acquired by this scan to acquire the white reference data. A timing at which the calibration is performed is: a timing of powering on/off the image forming apparatus 1, a timing of the number of processed sheets by the image reading apparatus 2 reaches the predetermined number of sheets, a timing of a predetermined period of use has being passed, or a similar timing.

Figure 5:
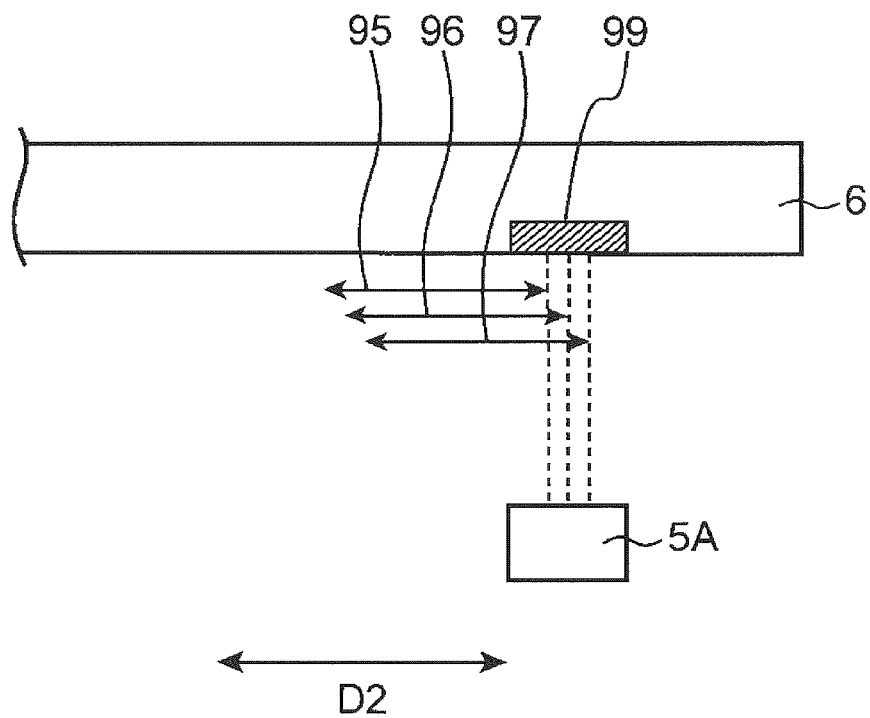
FIG. 5 schematically illustrates reading of a white reference member by one-line sensor.

FIG. 5 illustrates a reading position (a reading range) of the white reference member 6 with the lights of the respective colors, red, green, and blue. During scanning the white reference member 6, the reading unit 3 switches emitted light color (R, G, and B) whenever the reading unit 3 moves by ⅓ pixels in the sub-scanning direction D2. Therefore, a reading range 95 of red, a reading range 96 of green, and a reading range 97 of blue shift by ⅓ pixels from one another (shifts by 14 μm in reading at 600 dpi and shifts by 28 μm in reading at 300 dpi). The respective light receiving elements 5A, which constitute the one-line sensor, receive the reflected lights (dashed lines in the drawing) from the white reference member 6. Thus, in the scanning of the white reference member 6 by the CIS (the reading unit 3), the reading ranges 95, 96, and 97 of the respective colors approach to one another. Therefore, as illustrated in FIG. 5, if a foreign object 99 with different color attaches to the surface of the white reference member 6, influenced by the foreign object 99, abnormal white reference data is acquired at all the reading ranges 95, 96, and 97 of the respective colors.

FIG. 6 illustrates the electrical configuration of the image reading apparatus 2. With reference to FIG. 6, the image reading apparatus 2 further includes the control unit 91, a memory unit 92 (also referred to as a memory circuit), and a processing unit 93 (also referred to as a processing circuit). The control unit 91 controls operations of the reading unit 3. The memory unit 92 stores the image data and the white reference data on documents. The processing unit 93 processes the data stored in the memory unit 92.

The control unit 91 is connected to each of the light source 4, the light receiving unit 5, and the driving unit 9. The driving unit 9 includes a motor. The motor generates driving power to move the main unit 7. The driving power from the motor is transmitted to the main unit 7 via a power transmission mechanism, such as a gear and a pulley. With reference to FIG. 3, the control unit 91 controls the operations of the reading unit 3 to achieve the following. While the reading unit 3 is moved relative to the white reference member 6 in the sub-scanning direction D2, from the light source 4, the lights of the respective colors R, G, and B are irradiated to the plurality of reading positions on the white reference member 6. The light receiving unit 5 is caused to receive the reflected light. Specifically, the control unit 91 controls the driving unit 9 such that the main unit 7 moves relative to the white reference member 6 in the sub-scanning direction D2. The control unit 91 controls the light source 4 such that the light irradiated to the plurality of respective reading positions on the white reference member 6 switches among the three color lights, red, green, and blue. The control unit 91 controls the light receiving unit 5 such that the plurality of light receiving elements 5A (FIG. 4) each receive the reflected lights of red, green, and blue lights irradiated to the white reference member 6.

Figure 7:
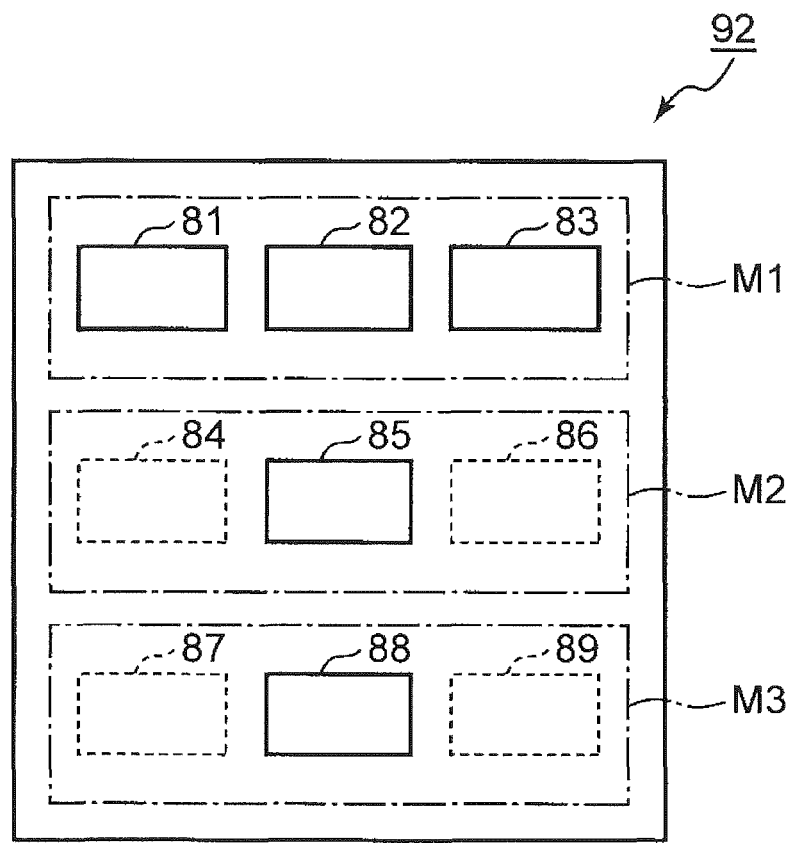
FIG. 7 schematically illustrates a memory structure in a memory unit included in the image reading apparatus according to one embodiment.

The memory unit 92 is connected to the light receiving unit 5 and the processing unit 93. FIG. 7 schematically illustrates a memory structure in the memory unit 92. The memory unit 92 includes a first memory area M1, a second memory area M2, and a third memory area M3, in addition to a memory area for storing the image data on the documents. The first memory area M1 stores the white reference data. The second memory area M2 is to sort the white reference data to perform a process, such as identification of abnormal data. The third memory area M3 stores information on the identified abnormal data.

The first memory area M1 includes a red storage area 81, a green storage area 82, and a blue storage area 83. The red storage area 81 stores red white reference data. The green storage area 82 stores green white reference data. The blue storage area 83 stores blue white reference data. Here, the white reference data exists by the number of: the number of pixels of the light receiving unit 5×the number of reading positions on the white reference member 6 for each color. The white reference data is data that becomes a base to calculate average white reference data, which will be described later. The second memory area M2 includes a green process area 85 to sort the green white reference data.

The third memory area M3 includes a green storage area 88 to store the information on abnormal data on green. Here, usually, each of a red process area 84, which is to sort red white reference data, a blue process area 86, which is to sort blue white reference data, a red storage area 87, which stores information on red abnormal data, and a blue storage area 89, which stores information on blue abnormal data, are required. However, this embodiment does not require these areas.

Now returning to FIG. 6, the processing unit 93 is connected to the memory unit 92. The processing unit 93 sorts the white reference data in the second memory area M2 (FIG. 7) of the memory unit 92 or performing a similar operation to perform a process to identify the abnormal data included in the white reference data, which is stored in the memory unit 92. The processing unit 93 excludes this abnormal data to calculate the average white reference data for each pixel 5A (light receiving element) from the white reference data in the first memory area M1, associates the average white reference data with a pixel address, and stores the associated average white reference data in the memory unit 92.

Reading of Image Data on Document

Figure 8:
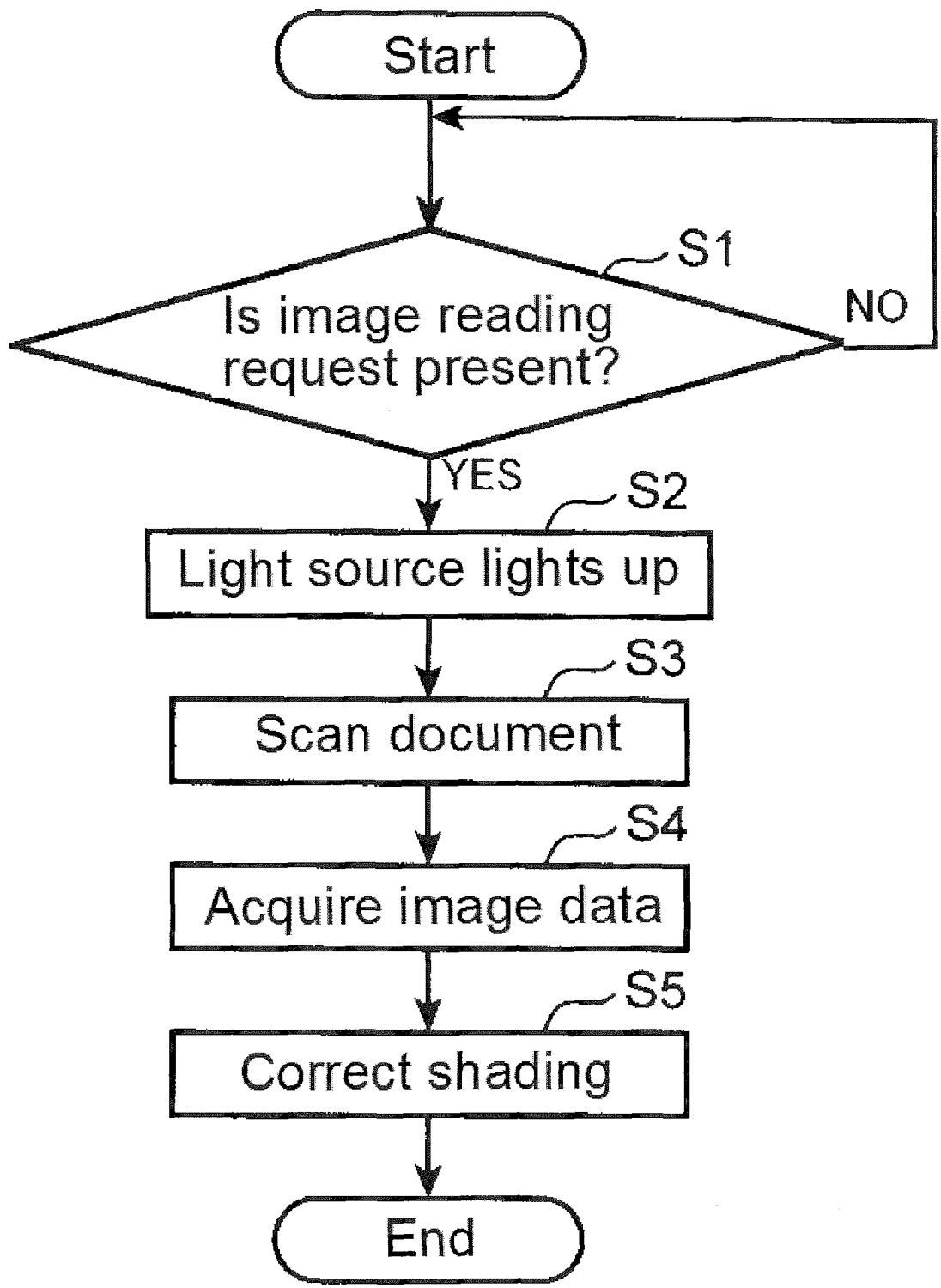
FIG. 8 illustrates a procedure for reading a document image.

The following describes the procedure for reading the document image by the image reading apparatus 2 with reference to the flowchart illustrated in FIG. 8.

With reference to FIG. 8, first, presence of an image reading request is determined (S1). When a start copy button is pressed with the document P placed on the fixed document reading glass 70 (FIG. 2), it is determined that the image reading request is "present" (S1: "YES"). When the start copy button is pressed with the document placed on the document tray 15 (FIG. 1), similarly, it is determined that the image reading request is "present." The following describes only the case where the document P is placed by the hands on the fixed document reading glass 70.

When the image reading request is determined as "present," the light source 4 of the reading unit 3 lights up (S2). While moving in the sub-scanning direction D2, the reading unit 3 irradiates the document P, which is placed on the fixed document reading glass 70, from the back surface 70B side, with being simultaneously switched lights of respective colors of red, green, and blue in turn. The reading unit 3 receives the reflected light to scan the document P (S3). This acquires the image data on the document P (S4). Afterwards, a shading correction is performed on the acquired image data (S5), thus acquiring the image data on the document.

Acquisition of White Reference Data

Figure 9:
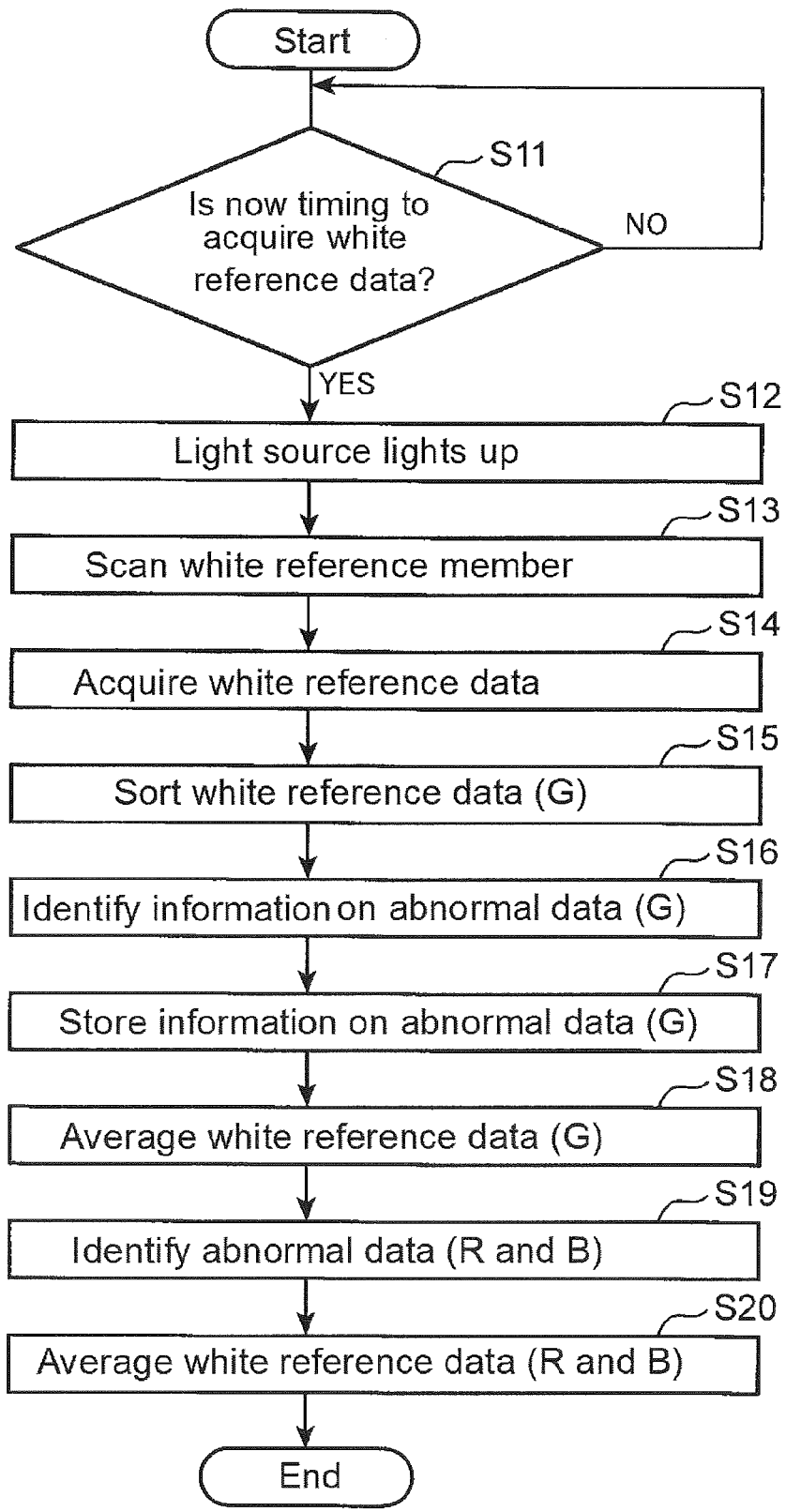
FIG. 9 illustrates a procedure for reading a white reference member.

Next, the following describes a procedure of acquiring the white reference data by the image reading apparatus 2 with reference to the flowchart illustrated in FIG. 9.

First, whether now is a timing to acquire the white reference data or not is determined (S11). For example, when the image reading apparatus 2 confirms that an image reading process is performed by the predetermined number of sheets, the image reading apparatus 2 determines that now is the timing of acquiring the white reference data (S11: "YES"). When the image reading apparatus 2 determines that now is the timing to acquire the white reference data, the control unit 91 controls the driving unit 9 to move the main unit 7 from a home position to a position below the white reference member 6 and lights up the light source 4 (S12). Then, the reading unit 3 starts scanning the white reference member 6 (S13).

Figure 10:
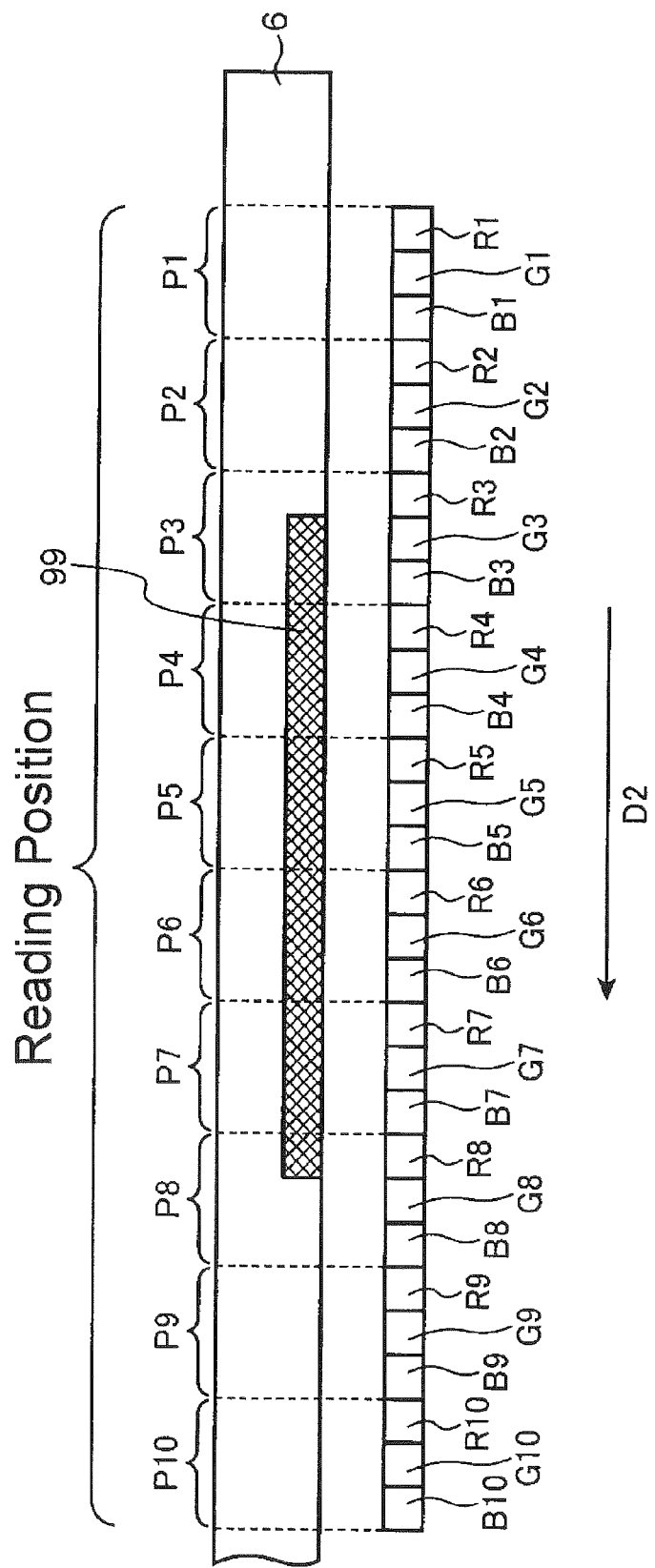
FIG. 10 schematically illustrates a scanned status of the white reference member by a reading unit.

Here, the following describes the details of scanning the white reference member 6 by the reading unit 3 with reference to FIG. 10. The control unit 91 controls the reading unit 3 to move the reading unit 3 below the white reference member 6 in the sub-scanning direction D2. Then, the control unit 91 causes the light receiving unit 5 to acquire the white reference data from a plurality of reading positions P1 to P10 on this white reference member 6. In FIGS. 10, R1 to R10 indicate positions of the reading unit 3 at a timing of acquiring the red white reference data. In FIGS. 10, G1 to G10 indicate positions of the reading unit 3 at a timing of acquiring the green white reference data. In FIGS. 10, B1 to B10 indicate positions of the reading unit 3 at a timing of acquiring the blue white reference data.

The control unit 91 controls the driving unit 9 to move the main unit 7 relative to the white reference member 6 in the sub-scanning direction D2. The control unit 91 causes the light source 4 to irradiate the plurality of reading positions P1 to P10 with the lights of respective colors of red, green, and blue. Additionally, the control unit 91 causes the light receiving unit 5 to receive the reflected lights. Specifically, while the control unit 91 switches the light irradiated from the light source 4 to the white reference member 6 among the three colors, red, green, and blue in turn, the control unit 91 moves the main unit 7 in the sub-scanning direction D2. Then, the reflected light that the control unit 91 causes the light receiving unit 5 to receive is photoelectrically converted. The first memory area M1 of the memory unit 92 stores the converted reflected light as the white reference data (S14). Thus, the white reference data are acquired from the plurality of reading positions P1 to P10 on the white reference member 6 for the lights of the respective colors, red, green, and blue. FIG. 10 illustrates the ten reading positions P1 to P10 on the white reference member 6; however, the number of reading positions is not specifically limited (for example, 100 positions may be applicable).

Next, the white reference data is sorted on the light of abnormal-data detected color among red, green, and blue (S15). Here, the description will be given of the case where the green is the abnormal-data detected color. The processing unit 93 sorts the white reference data in an order of brightness (0 to 255) in the second memory area M2 (the green process area 85) of the memory unit 92. Among the sorted data, data whose luminance value is outstandingly different from white reference data is identified as the abnormal data (S16). The address assigned to this abnormal data is identified. Additionally, the reading positions on the white reference member 6 when this abnormal data is acquired are identified. In this embodiment, as illustrated in FIG. 10, the abnormal data is acquired due to the foreign object 99. Therefore, among the plurality of reading positions P1 to P10, the reading positions P3 to P7 are identified. The third memory area M3 (the green storage area 88) (FIG. 7) of the memory unit 92 stores information (the addresses and the reading positions) on the abnormal data identified in the green light (S17). Afterwards, the processing unit 93 excludes the abnormal data and performs the averaging process on the white reference data. This acquires an average value (average white reference data) of the white reference data on green (S18). When the abnormal data is not included, the averaging process is performed on the all acquired white reference data.

This embodiment describes the case where the green white reference data, which is the abnormal-data detected color, is sorted in the order of brightness and then the information on the abnormal data is identified; however, this should not be construed in a limiting sense. That is, the sorting of the white reference data is not necessary. The information (the addresses and the reading positions) on the abnormal data may be identified by comparison of individual white reference data with a predetermined value one by one.

Next, the abnormal data included in the white reference data is identified on the lights of red and blue where green, which is the abnormal-data detected color, is excluded from the three colors of red, green, and blue (S19). At this time, the white reference data is not sorted like the case of green. Based on the information on the abnormal data identified in the green light, the abnormal data is identified. Specifically, the processing unit 93 refers to the information (the addresses and the reading positions) on the abnormal data regarding green, which is stored in the third memory area M3. The white reference data acquired from the reading positions identical to the reading positions P3 to P7 where the abnormal data has been acquired in green is similarly identified as the abnormal data in red and blue as well. Afterwards, similar to the case of green, the averaging process is performed on the white reference data excluding the abnormal data. Thus, the average values of the white reference data (the average white reference data) is also acquired on red and blue (S20). Thus, the average values of the white reference data are acquired from the respective red, green, and blue. Using this, the above-described shading correction (FIG. 8, S5) can be performed. Thus, in this embodiment, the information on the abnormal data regarding green, which is the abnormal-data detected color, can also be utilized to red and blue. Therefore, as illustrated in FIG. 7, the areas 84 and 86, which are areas to sort the white reference data, and the areas 87 and 89, which store the information on the abnormal data, are unnecessary for red and blue.

Operational Effects Brought by Image Reading Apparatus

Next, the following describes the operational effects brought by the image reading apparatus 2. The image reading apparatus 2 includes the reading unit 3, which includes the light source 4 and the light receiving unit 5, the white reference member 6, the control unit 91, the memory unit 92, and the processing unit 93. The control unit 91 causes the light source 4 to irradiate the white reference member 6 with the three color lights, red, green, and blue. The control unit 91 controls the reading unit 3 such that the light receiving unit 5 receives the reflected lights. The memory unit 92 stores the white reference data acquired by receiving these reflected lights. The processing unit 93 performs a process of identifying the abnormal data included in the white reference data. The processing unit 93 identifies the information on the abnormal data of the green light, which has been set as the abnormal-data detected color, among red, green, and blue. Additionally, the processing unit 93 identifies the abnormal data in red and blue lights based on the information on the abnormal data identified in the green light. The image forming apparatus 1 includes the image reading apparatus 2.

With the image reading apparatus 2, the processing unit 93 identifies the abnormal data included in the white reference data, excludes this abnormal data, and performs the averaging process. This acquirers appropriate white reference data. Among the three colors of red, green, and blue, the processing unit 93 identifies the information on the abnormal data in the green light set as the abnormal-data detected color. This information can be utilized to identify the abnormal data in the red and blue lights. Specifically, the processing unit 93 identifies the red and blue white reference data acquired at the reading positions identical to the reading positions P3 to P7 where the abnormal data has been acquired in green as the abnormal data. By this, independent from the respective colors, the white reference data are sorted. This efficiently identifies the abnormal data compared with the case where the abnormal data is identified based on the luminance values. Accordingly, as illustrated in FIG. 7, regarding red and blue, memory areas to sort the white reference data and memory areas storing the information on the abnormal data are unnecessary. This restrains an increase in device cost. The image forming apparatus 1 with the image reading apparatus 2 restrains the increase in device cost. Additionally, the use of appropriate white reference data performs high-quality image formation process.

With the image reading apparatus 2, the control unit 91 controls the reading unit 3 to achieve the following. The light source 4 irradiates the plurality of reading positions P1 to P10 on the white reference member 6 with the lights of red, green, and blue while the reading unit 3 moves relative to the white reference member 6. Additionally, the light receiving unit 5 receives the reflected lights. The memory unit 92 stores the plurality of white reference data, which are acquired by receiving the reflected lights from the plurality of reading positions P1 to P10. Then, the averaging process is performed on the plurality of white reference data acquired from the plurality of reading positions P1 to P10. This acquires more appropriate white reference data where an influence, such as the variation in print density of the white reference member 6 and the foreign object, is reduced.

With the image reading apparatus 2, the control unit 91 controls the reading unit 3 so as to move relative to the white reference member 6 while repeating a lighting cycle. In the lighting cycle, the light irradiated from the light source 4 to the white reference member 6 is switched among the three colors of red, green, and blue. Compared with the case where the scanning of the white reference member 6 by the reading unit 3 is repeated for each color, this reduces a deviation of the reading positions on the white reference member 6.

With the image reading apparatus 2, the light receiving unit 5 is a sensor where the plurality of light receiving elements 5A are one-dimensionally arrayed. The control unit 91 causes each of the plurality of light receiving elements 5A to receive the reflected lights of the lights of red, green, and blue irradiated to the white reference member 6. Thus, for reading with the one-line sensor, as described with reference to FIG. 5, the reading positions on the white reference member 6 with the lights of the respective colors approach to one another. Therefore, the following is preferable. Setting the light with the abnormal-data detected color (green) as a representative, the information (the addresses and the reading positions) on the abnormal data is identified. The information is used for the lights of the other colors (red and blue).

Modification

Finally, the following describes modifications of the image reading apparatus 2 according to the embodiment. With reference to FIG. 10, the processing unit 93 may identify the white reference data acquired from reading positions for the lights of red and blue as the abnormal data. The reading positions are identical to the reading positions P3 to P7 where the abnormal data has been acquired in the green light. Further, the processing unit 93 may identify the white reference data acquired from the reading positions P2 and P8, which are adjacent to the reading positions P3 to P7, for the lights of the three colors of red, green, and blue as the abnormal data.

In the embodiment, although the red white reference data acquired from the reading position P8 becomes the abnormal data due to the foreign object 99, the abnormal data is not identified. However, the modification can identify this abnormal data. Thus, the modification identifies the abnormal data included in the white reference data with more certainty and excludes the abnormal data from the target for averaging process. This acquires the more appropriate average value of the white reference data.

Figure 11:
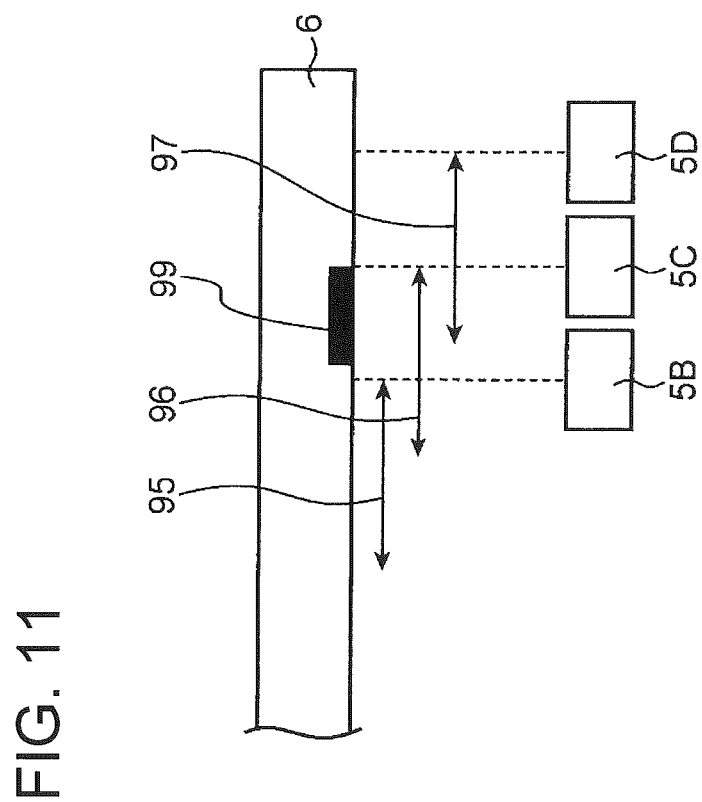
FIG. 11 schematically illustrates reading of the white reference member by three-line sensor.

As described in the embodiment, the CIS that includes the one-line sensor receiving the reflected lights of red, green, and blue at the respective light receiving elements 5A may be employed (FIG. 5). However, this should not be constructed in a limiting sense. As illustrated in FIG. 11, a CCD sensor or a CIS that includes a three-line sensor may be used. The CCD sensor or the CIS includes a red light receiving element 5B, a green light receiving element 5C, and a blue light receiving element 5D. The red light receiving element 5B receives the red reflected light. The green light receiving element 5C receives the green reflected light. The blue light receiving element 5D receives the blue reflected light. Thus, when using the three-line sensor, corresponding to a distance between the sensors, the green light receiving element 5C and the red light receiving element 5B, an abnormal data address of green is shifted to identify the abnormal data address of red. Corresponding to a distance between the sensors, the green light receiving element 5C and the blue light receiving element 5D, the abnormal data address is similarly shifted to identify the abnormal data address of blue. After excluding these abnormal data, the averaging process can be performed on the white reference data.

In the embodiment, the abnormal-data detected color is not limited to green but may be red or blue.

In the embodiment, the switching of lighting of the light source 4 is not limited to the order of red, green, and blue, but may be switched in any order.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus, comprising:
a reading circuit that includes a light source and a light receiving unit;
a white reference member;
a control circuit that controls the reading circuit to:
cause the light source to irradiate the white reference member with lights of a plurality of colors; and
cause the light receiving unit to receive the reflected lights;
a memory circuit that stores white reference data acquired by receiving the reflected lights; and
a processing circuit that performs a process to identify abnormal data included in the white reference data stored in the memory circuit,
wherein the processing circuit identifies information on the abnormal data in a light of an abnormal-data detected color among the plurality of colors, the processing circuit identifying the abnormal data in lights of other colors excluding the abnormal-data detected color among the plurality of colors based on the information on the abnormal data, the information being identified for the light of the abnormal-data detected color,
the control circuit moves the reading circuit relative to the white reference member, while the control circuit controls the reading circuit to: cause the light source to irradiate a plurality of reading positions on the white reference member with the lights of the plurality of colors; and cause the light receiving unit to receive the reflected lights, the memory circuit stores a plurality of the white reference data, the white reference data being acquired by receiving the reflected lights from the plurality of reading positions, and the processing circuit identifies the information on the abnormal data by comparison of individual white reference data with a predetermined value.

2. The image reading apparatus according to claim 1, wherein the control circuit controls the reading circuit so as to move relative to the white reference member while repeating a lighting cycle, a light irradiated from the light source to the white reference member being switched among three colors of red, green, and blue in the lighting cycle.

3. The image reading apparatus according to claim 1, wherein the processing circuit identifies a reading position where the abnormal data has been acquired among the plurality of reading positions for the light of the abnormal-data detected color, and the processing circuit identifies the white reference data acquired from a reading position for the light of the other color as the abnormal data, the reading position being identical to the reading position where the abnormal data has been acquired for the light of the abnormal-data detected color.

4. The image reading apparatus according to claim 3, wherein the processing circuit identifies the white reference data acquired from reading positions for the lights of the plurality of colors as the abnormal data, the reading positions being adjacent to the reading position where the abnormal data has been acquired for the light of the abnormal-data detected color.

5. The image reading apparatus according to claim 1, wherein the light receiving unit is a sensor where a plurality of light receiving elements are one-dimensionally arrayed, and the control circuit causes the respective plurality of light receiving elements to receive the reflected lights of the lights of the plurality of colors irradiated to the white reference member.

6. An image forming apparatus, comprising the image reading apparatus according to claim 1.

* * * * *